US008620518B2

(12) United States Patent
Bradley et al.

(10) Patent No.: US 8,620,518 B2
(45) Date of Patent: Dec. 31, 2013

(54) SYSTEMS AND METHODS FOR ACCIDENT RECONSTRUCTION

(75) Inventors: David L. Bradley, Alpharetta, GA (US); Marc David Siris, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 13/485,400

(22) Filed: May 31, 2012

(65) Prior Publication Data

US 2013/0030642 A1 Jan. 31, 2013

Related U.S. Application Data

(60) Provisional application No. 61/511,874, filed on Jul. 26, 2011.

(51) Int. Cl.
*G01M 17/00* (2006.01)

(52) U.S. Cl.
USPC .......................................................... 701/32.2

(58) Field of Classification Search
USPC .......................................................... 701/32.2
See application file for complete search history.

(56) References Cited

U.S. PATENT DOCUMENTS

| | | | |
|---|---|---|---|
| 5,638,273 A | 6/1997 | Coiner et al. | |
| 5,815,093 A | 9/1998 | Kikinis | |
| 2002/0035422 A1 | 3/2002 | Sasaki | |
| 2002/0198640 A1* | 12/2002 | Gehlot et al. | 701/35 |
| 2007/0027583 A1* | 2/2007 | Tamir et al. | 701/1 |
| 2009/0177382 A1* | 7/2009 | Alles et al. | 701/208 |
| 2009/0222163 A1* | 9/2009 | Plante | 701/35 |
| 2011/0130906 A1* | 6/2011 | Mayer | 701/22 |
| 2012/0303203 A1* | 11/2012 | Olsen et al. | 701/29.1 |

FOREIGN PATENT DOCUMENTS

| | | |
|---|---|---|
| EP | 1696207 A1 | 8/2006 |
| WO | WO 94/04975 A1 | 3/1994 |
| WO | WO 2008/151103 A1 | 12/2008 |
| WO | WO 2009/025789 A1 | 2/2009 |

OTHER PUBLICATIONS

International Searching Authority, Invitation to Pay Additional Fees and, Where Applicable, Protest Fee for International Application No. PCT/US2012/044114, mailed Oct. 5, 2012, 7 pages, European Patent Office, The Netherlands.

International; Searching Authority, International Search Report and Written Opinion for International Application No. PCT/US2012/044114, mailed Dec. 3, 2012, 18 pages, European Patent Office, The Netherlands.

* cited by examiner

*Primary Examiner* — James Trammell
*Assistant Examiner* — Michael D Lang
(74) *Attorney, Agent, or Firm* — Alston & Bird LLP

(57) ABSTRACT

According to various embodiments, systems and methods are provided for capturing vehicle activity data and filtering such data to reconstruct accident conditions according to a predetermined level of accuracy.

19 Claims, 12 Drawing Sheets

Typical GPS data Without Accident Data

| sDescription | dtDateTime | fLongitude | fLatitude | fSpeed | bIgnition | bAux1 | bAux2 | bAux3 | bAux4 | iLogReason |
|---|---|---|---|---|---|---|---|---|---|---|
| 656944 | 6/1/2011 18:00:05 | -71.30733 | 41.47017 | 48 | 1 | 1 | 1 | 0 | 0 | 3 |
| 656944 | 6/1/2011 18:00:38 | -71.30745 | 41.4714 | 55 | 1 | 1 | 0 | 0 | 0 | 5 |
| 656944 | 6/1/2011 18:00:40 | -71.30778 | 41.47485 | 35 | 1 | 1 | 0 | 0 | 0 | 3 |
| 656944 | 6/1/2011 18:00:46 | -71.30782 | 41.47509 | 0 | 1 | 1 | 0 | 0 | 0 | 21 |
| 656944 | 6/1/2011 18:00:47 | -71.30782 | 41.47509 | 0 | 1 | 1 | 1 | 0 | 0 | 5 |
| 656944 | 6/1/2011 18:00:57 | -71.30782 | 41.47512 | 7 | 1 | 1 | 1 | 0 | 0 | 22 |
| 656944 | 6/1/2011 18:00:59 | -71.30782 | 41.4752 | 18 | 1 | 1 | 1 | 0 | 0 | 3 |
| 656944 | 6/1/2011 18:01:10 | -71.30785 | 41.47606 | 41 | 1 | 1 | 1 | 0 | 0 | 3 |
| 656944 | 6/1/2011 18:01:40 | -71.30847 | 41.47984 | 53 | 1 | 1 | 1 | 0 | 0 | 3 |
| 656944 | 6/1/2011 18:01:56 | -71.30847 | 41.47984 | 53 | 1 | 1 | 0 | 0 | 0 | 5 |
| 656944 | 6/1/2011 18:02:03 | -71.30847 | 41.47984 | 53 | 1 | 1 | 1 | 0 | 0 | 5 |
| 656944 | 6/1/2011 18:02:10 | -71.30869 | 41.48211 | 17 | 1 | 1 | 1 | 0 | 0 | 2 |
| 656944 | 6/1/2011 18:02:19 | -71.30899 | 41.48211 | 22 | 1 | 1 | 0 | 0 | 0 | 5 |
| 656944 | 6/1/2011 18:02:22 | -71.30936 | 41.48214 | 9 | 1 | 1 | 1 | 0 | 0 | 5 |
| 656944 | 6/1/2011 18:02:37 | -71.30946 | 41.48242 | 0 | 1 | 1 | 1 | 0 | 0 | 21 |
| 656944 | 6/1/2011 18:02:38 | -71.3095 | 41.4824 | 0 | 1 | 1 | 0 | 0 | 0 | 5 |
| 656944 | 6/1/2011 18:02:41 | -71.30954 | 41.4824 | 0 | 1 | 1 | 0 | 1 | 0 | 5 |
| 656944 | 6/1/2011 18:02:43 | -71.30954 | 41.4824 | 0 | 0 | 1 | 0 | 1 | 0 | 6 |
| 656944 | 6/1/2011 18:02:44 | -71.30954 | 41.48242 | 0 | 0 | 1 | 1 | 1 | 0 | 5 |
| 656944 | 6/1/2011 18:03:08 | -71.30954 | 41.4824 | 0 | 0 | 1 | 1 | 0 | 0 | 5 |
| 656944 | 6/1/2011 18:09:58 | -71.30954 | 41.48238 | 0 | 0 | 1 | 1 | 1 | 0 | 5 |
| 656944 | 6/1/2011 18:10:22 | -71.30954 | 41.48238 | 0 | 0 | 1 | 1 | 0 | 0 | 5 |

FIG. 4

Typical GPS data With Accident Data

| sDescription | dtDateTime | fLongitude | fLatitude | fSpeed | bIgnition | bAux1 | bAux2 | bAux3 | bAux4 | iLogReason |
|---|---|---|---|---|---|---|---|---|---|---|
| 656944 | 6/1/2011 18:00:00 | -71.30723 | 41.46962 | 44 | 1 | 1 | 1 | 0 | 0 | 1 |
| 656944 | 6/1/2011 18:00:05 | -71.30733 | 41.47017 | 48 | 1 | 1 | 1 | 0 | 0 | 3 |
| 656944 | 6/1/2011 18:00:14 | -71.30745 | 41.4714 | 55 | 1 | 1 | 1 | 0 | 0 | 1 |
| 656944 | 6/1/2011 18:00:38 | -71.30745 | 41.4714 | 55 | 1 | 1 | 0 | 0 | 0 | 5 |
| 656944 | 6/1/2011 18:00:40 | -71.30778 | 41.47485 | 35 | 1 | 1 | 0 | 0 | 0 | 3 |
| 656944 | 6/1/2011 18:00:44 | -71.30782 | 41.47503 | 13 | 1 | 1 | 0 | 0 | 0 | 1 |
| 656944 | 6/1/2011 18:00:45 | -71.30782 | 41.47507 | 7 | 1 | 1 | 0 | 0 | 0 | 1 |
| 656944 | 6/1/2011 18:00:46 | -71.30782 | 41.47509 | 0 | 1 | 1 | 0 | 0 | 0 | 21 |
| 656944 | 6/1/2011 18:00:47 | -71.30782 | 41.47509 | 0 | 1 | 1 | 1 | 0 | 0 | 5 |
| 656944 | 6/1/2011 18:00:57 | -71.30782 | 41.47512 | 7 | 1 | 1 | 1 | 0 | 0 | 22 |
| 656944 | 6/1/2011 18:00:58 | -71.30782 | 41.47516 | 15 | 1 | 1 | 1 | 0 | 0 | 1 |
| 656944 | 6/1/2011 18:00:59 | -71.30782 | 41.4752 | 18 | 1 | 1 | 1 | 0 | 0 | 3 |
| 656944 | 6/1/2011 18:01:00 | -71.30782 | 41.47525 | 22 | 1 | 1 | 1 | 0 | 0 | 1 |
| 656944 | 6/1/2011 18:01:01 | -71.30782 | 41.47532 | 24 | 1 | 1 | 1 | 0 | 0 | 1 |
| 656944 | 6/1/2011 18:01:10 | -71.30785 | 41.47606 | 41 | 1 | 1 | 1 | 0 | 0 | 3 |
| 656944 | 6/1/2011 18:01:40 | -71.30847 | 41.47984 | 53 | 1 | 1 | 1 | 0 | 0 | 3 |
| 656944 | 6/1/2011 18:01:56 | -71.30847 | 41.47984 | 53 | 1 | 1 | 0 | 0 | 0 | 5 |
| 656944 | 6/1/2011 18:02:03 | -71.30847 | 41.47984 | 53 | 1 | 1 | 1 | 0 | 0 | 5 |
| 656944 | 6/1/2011 18:02:06 | -71.30855 | 41.48209 | 11 | 1 | 1 | 1 | 0 | 0 | 1 |
| 656944 | 6/1/2011 18:02:07 | -71.30859 | 41.48211 | 11 | 1 | 1 | 1 | 0 | 0 | 1 |
| 656944 | 6/1/2011 18:02:08 | -71.30862 | 41.48211 | 13 | 1 | 1 | 1 | 0 | 0 | 1 |
| 656944 | 6/1/2011 18:02:10 | -71.30869 | 41.48211 | 17 | 1 | 1 | 1 | 0 | 0 | 2 |
| 656944 | 6/1/2011 18:02:11 | -71.30877 | 41.48211 | 18 | 1 | 1 | 1 | 0 | 0 | 1 |
| 656944 | 6/1/2011 18:02:12 | -71.30885 | 41.48212 | 18 | 1 | 1 | 1 | 0 | 0 | 1 |
| 656944 | 6/1/2011 18:02:14 | -71.30899 | 41.48211 | 22 | 1 | 1 | 1 | 0 | 0 | 1 |
| 656944 | 6/1/2011 18:02:19 | -71.30899 | 41.48211 | 22 | 1 | 1 | 0 | 0 | 0 | 5 |
| 656944 | 6/1/2011 18:02:21 | -71.30936 | 41.48214 | 9 | 1 | 1 | 0 | 0 | 0 | 1 |
| 656944 | 6/1/2011 18:02:22 | -71.30936 | 41.48214 | 9 | 1 | 1 | 1 | 0 | 0 | 5 |
| 656944 | 6/1/2011 18:02:23 | -71.30943 | 41.48216 | 7 | 1 | 1 | 1 | 0 | 0 | 1 |
| 656944 | 6/1/2011 18:02:25 | -71.30943 | 41.48222 | 11 | 1 | 1 | 1 | 0 | 0 | 1 |
| 656944 | 6/1/2011 18:02:26 | -71.30943 | 41.48223 | 9 | 1 | 1 | 1 | 0 | 0 | 1 |
| 656944 | 6/1/2011 18:02:28 | -71.30939 | 41.48229 | 9 | 1 | 1 | 1 | 0 | 0 | 1 |
| 656944 | 6/1/2011 18:02:29 | -71.30936 | 41.48231 | 9 | 1 | 1 | 1 | 0 | 0 | 1 |
| 656944 | 6/1/2011 18:02:30 | -71.30936 | 41.48233 | 9 | 1 | 1 | 1 | 0 | 0 | 1 |
| 656944 | 6/1/2011 18:02:31 | -71.30939 | 41.48235 | 7 | 1 | 1 | 1 | 0 | 0 | 1 |
| 656944 | 6/1/2011 18:02:32 | -71.30939 | 41.48236 | 7 | 1 | 1 | 1 | 0 | 0 | 1 |
| 656944 | 6/1/2011 18:02:33 | -71.30939 | 41.48238 | 7 | 1 | 1 | 1 | 0 | 0 | 1 |
| 656944 | 6/1/2011 18:02:34 | -71.30943 | 41.4824 | 7 | 1 | 1 | 1 | 0 | 0 | 1 |
| 656944 | 6/1/2011 18:02:35 | -71.30943 | 41.4824 | 7 | 1 | 1 | 1 | 0 | 0 | 1 |
| 656944 | 6/1/2011 18:02:36 | -71.30946 | 41.48242 | 6 | 1 | 1 | 1 | 0 | 0 | 1 |
| 656944 | 6/1/2011 18:02:37 | -71.30946 | 41.48242 | 0 | 1 | 1 | 1 | 0 | 0 | 21 |
| 656944 | 6/1/2011 18:02:38 | -71.3095 | 41.4824 | 0 | 1 | 1 | 0 | 0 | 0 | 5 |
| 656944 | 6/1/2011 18:02:41 | -71.30954 | 41.4824 | 0 | 1 | 1 | 0 | 1 | 0 | 5 |
| 656944 | 6/1/2011 18:02:43 | -71.30954 | 41.4824 | 0 | 0 | 1 | 0 | 1 | 0 | 6 |
| 656944 | 6/1/2011 18:02:44 | -71.30954 | 41.48242 | 0 | 0 | 1 | 1 | 1 | 0 | 5 |
| 656944 | 6/1/2011 18:03:08 | -71.30954 | 41.4824 | 0 | 0 | 1 | 1 | 0 | 0 | 5 |
| 656944 | 6/1/2011 18:09:58 | -71.30954 | 41.48238 | 0 | 0 | 1 | 1 | 1 | 0 | 5 |
| 656944 | 6/1/2011 18:10:22 | -71.30954 | 41.48238 | 0 | 0 | 1 | 1 | 0 | 0 | 5 |

FIG. 5

| | | | | | |
|---|---|---|---|---|---|
| Day_Date | 00:00.0 | 00:00.0 | 00:00.0 | 00:00.0 | 00:00.0 |
| Pkg_Barcode_Num | 1Z67877603532511б1 | | | | |
| DIAD_Label_Type_Cd | 36 | 36 | 36 | 36 | 36 |
| DIAD_Label_Type_Desc | PACKAGE | PACKAGE | PACKAGE | PACKAGE | PACKAGE |
| DIAD_Type_Cd | 4 | 4 | 4 | 4 | 4 |
| DIAD_Type_Desc | DIAD 4 | DIAD 4 | DIAD 4 | DIAD 4 | DIAD 4 |
| Trigger_1_GPS_Latitude | 38.52285667 | 29.963895 | 29.95724833 | 29.95724833 | 33.50092 |
| Trigger_1_GPS_Latitude_Direct_Cd | N | N | N | N | N |
| Trigger_1_GPS_Latitude_Direct_Desc | NORTH | NORTH | NORTH | NORTH | NORTH |
| Trigger_1_GPS_Longitude | 90.40380833 | 90.11329333 | 90.098485 | 90.098485 | 111.9258083 |
| Trigger_1_GPS_Longitude_Direct_Cd | W | W | W | W | W |
| Trigger_1_GPS_Longitude_Direct_Desc | WEST | WEST | WEST | WEST | WEST |
| Trigger_1_GPS_Satellite_Qty | 6 | 7 | 7 | 7 | 5 |
| Trigger_1_GPS_Speed_Knots_Over_Ground | 0.66 | 1.11 | 1.04 | 1.04 | 0.3 |
| Trigger_1_Horizontal_Dilution_of_Precision | 1.3 | 1.3 | 1.3 | 1.3 | 1.3 |
| Trigger_1_GPS_Trigger_Cd | 1 | 1 | 1 | 1 | 1 |
| Trigger_1_GPS_Trigger_Desc | DELIV-1ST SIGNATURE | DELIV-1ST SIGNATURE | DELIV-1ST SIGNATURE | DELIV-1ST SIGNATURE | DELIV-1ST SIGNATURE |
| Trigger_1_GPS_Validity_Cd | A | V | A | A | A |
| Trigger_1_GPS_Validity_Desc | VALID DATA | WARNING | VALID DATA | VALID DATA | VALID DATA |
| Trigger_1_GPS_Misdelivery_Feedback_Cd | 3 | 3 | 3 | 3 | 3 |
| Trigger_1_GPS_Misdelivery_Feedback_Desc | POSITIVE GPS FEEDBACK | POSITIVE GPS FEEDBACK | POSITIVE GPS FEEDBACK | POSITIVE GPS FEEDBACK | POSITIVE GPS FEEDBACK |
| Trigger_1_GPS_Error_Cd | 0 | 0 | 0 | 0 | 0 |
| Trigger_1_GPS_Error_Desc | GPS OPERATIONAL | GPS OPERATIONAL | GPS OPERATIONAL | GPS OPERATIONAL | GPS OPERATIONAL |
| Trigger_2_GPS_Latitude | 38.522795 | 29.963945 | 29.95731667 | 29.95731667 | 33.50088833 |
| Trigger_2_GPS_Latitude_Direct_Cd | N | N | N | N | N |
| Trigger_2_GPS_Latitude_Direct_Desc | NORTH | NORTH | NORTH | NORTH | NORTH |
| Trigger_2_GPS_Longitude | 90.40377667 | 90.11326167 | 90.09859833 | 90.09859833 | 111.9257967 |
| Trigger_2_GPS_Longitude_Direct_Cd | W | W | W | W | W |
| Trigger_2_GPS_Longitude_Direct_Desc | WEST | WEST | WEST | WEST | WEST |
| Trigger_2_GPS_Satellite_Qty | 6 | 5 | 4 | 4 | 6 |
| Trigger_2_GPS_Speed_Knots_Over_Ground | 1.26 | 1.61 | 0 | 0 | 1.78 |
| Trigger_2_Horizontal_Dilution_of_Precision | 1.3 | 1.6 | 1.7 | 1.7 | 1.2 |
| Trigger_2_GPS_Trigger_Cd | 2 | 2 | 2 | 2 | 2 |
| Trigger_2_GPS_Trigger_Desc | DELIV-1ST LABEL SCAN | DELIV-1ST LABEL SCAN | DELIV-1ST LABEL SCAN | DELIV-1ST LABEL SCAN | DELIV-1ST LABEL SCAN |
| Trigger_2_GPS_Validity_Cd | A | V | V | V | A |
| Trigger_2_GPS_Validity_Desc | VALID DATA | WARNING | WARNING | WARNING | VALID DATA |
| Trigger_2_GPS_Misdelivery_Feedback_Cd | 3 | 3 | 3 | 3 | 3 |
| Trigger_2_GPS_Misdelivery_Feedback_Desc | POSITIVE GPS FEEDBACK | POSITIVE GPS FEEDBACK | POSITIVE GPS FEEDBACK | POSITIVE GPS FEEDBACK | POSITIVE GPS FEEDBACK |
| Trigger_2_GPS_Error_Cd | 0 | 0 | 0 | 0 | 0 |
| Trigger_2_GPS_Error_Desc | GPS OPERATIONAL | GPS OPERATIONAL | GPS OPERATIONAL | GPS OPERATIONAL | GPS OPERATIONAL |
| Trigger_3_GPS_Latitude | 38.52286 | 29.96465333 | 29.957245 | 29.957245 | 33.50093167 |
| Trigger_3_GPS_Latitude_Direct_Cd | N | N | N | N | N |
| Trigger_3_GPS_Latitude_Direct_Desc | NORTH | NORTH | NORTH | NORTH | NORTH |
| Trigger_3_GPS_Longitude | 90.403755 | 90.11276167 | 90.098485 | 90.098485 | 111.92582 |
| Trigger_3_GPS_Longitude_Direct_Cd | W | W | W | W | W |
| Trigger_3_GPS_Longitude_Direct_Desc | WEST | WEST | WEST | WEST | WEST |
| Trigger_3_GPS_Satellite_Qty | 6 | 3 | 7 | 7 | 4 |
| Trigger_3_GPS_Speed_Knots_Over_Ground | 0.44 | 0 | 1.27 | 1.27 | 1.1 |
| Trigger_3_Horizontal_Dilution_of_Precision | 1.3 | 50 | 1.3 | 1.3 | 1.7 |
| Trigger_3_GPS_Trigger_Cd | 3 | 3 | 3 | 3 | 3 |
| Trigger_3_GPS_Trigger_Desc | DELIV-STOP COMPLETE | DELIV-STOP COMPLETE | DELIV-STOP COMPLETE | DELIV-STOP COMPLETE | DELIV-STOP COMPLETE |
| Trigger_3_GPS_Validity_Cd | A | A | A | A | A |
| Trigger_3_GPS_Validity_Desc | VALID DATA | VALID DATA | VALID DATA | VALID DATA | VALID DATA |
| Trigger_3_GPS_Misdelivery_Feedback_Cd | 3 | 3 | 3 | 3 | 3 |
| Trigger_3_GPS_Misdelivery_Feedback_Desc | POSITIVE GPS FEEDBACK | POSITIVE GPS FEEDBACK | POSITIVE GPS FEEDBACK | POSITIVE GPS FEEDBACK | POSITIVE GPS FEEDBACK |
| Trigger_3_GPS_Error_Cd | 0 | 0 | 0 | 0 | 0 |
| Trigger_3_GPS_Error_Desc | GPS OPERATIONAL | GPS OPERATIONAL | GPS OPERATIONAL | GPS OPERATIONAL | GPS OPERATIONAL |
| Trigger_4_GPS_Latitude | @@ | @@ | @@ | @@ | @@ |
| Trigger_4_GPS_Latitude_Direct_Cd | 0 | 0 | 0 | 0 | 0 |
| Trigger_4_GPS_Latitude_Direct_Desc | DATA NOT AVAILABLE | DATA NOT AVAILABLE | DATA NOT AVAILABLE | DATA NOT AVAILABLE | DATA NOT AVAILABLE |
| Trigger_4_GPS_Longitude | @@ | @@ | @@ | @@ | @@ |
| Trigger_4_GPS_Longitude_Direct_Cd | 0 | 0 | 0 | 0 | 0 |
| Trigger_4_GPS_Longitude_Direct_Desc | DATA NOT AVAILABLE | DATA NOT AVAILABLE | DATA NOT AVAILABLE | DATA NOT AVAILABLE | DATA NOT AVAILABLE |

FIG. 9

SYSTEMS AND METHODS FOR ACCIDENT RECONSTRUCTION

CROSS-REFERENCE TO RELATED APPLICATIONS

The present application claims priority to U.S. Provisional Patent Application No. 61/511,874, filed Jul. 26, 2011, which is incorporated by reference in its entirety by reference.

FIELD OF THE INVENTION

The present invention relates to systems and methods for evaluating driver safety and accident conditions by recording, filtering, and/or processing data relating to vehicle operations and driver behaviors.

BACKGROUND OF THE INVENTION

Delivery services and other transportation-related businesses utilize large numbers of drivers and must therefore implement certain measures to minimize the risk of accidents. Not only are accidents costly in terms of damage to company property, damage to other property, and injuries to the involved parties, but for businesses where transportation is an integral component, such as delivery services, an accident disrupts delivery schedules and, therefore, the entire flow of the business's operations.

Since drivers with unsafe habits increase the risks and liabilities of the business, delivery businesses, or other businesses with a component involving vehicular operations, generally have a significant incentive to promote driver safety. Driver safety can be assessed by monitoring day-to-day operational behaviors and also by evaluating accidents when they occur. If a business is able to determine that a driver's unsafe behavior is the cause of an accident, this information is valuable in managing future risks and liabilities. For instance, the driver could then be reprimanded or closely monitored, in order reduce the likelihood of a future occurrence.

On the other hand, if other factors caused the accident, the business may be able to relieve itself of liability upon a showing of evidence that the driver was not at fault. Therefore, there is a need for systems and methods for collecting accident data for use in assessing potential causes of the accident.

BRIEF SUMMARY OF THE INVENTION

Various embodiments of the present invention provide systems and methods for evaluating driver safety and accident conditions by recording, filtering, and/or processing data relating to vehicle operations and driver behaviors. For instance, in one aspect of the invention, a method for evaluating data relating to a vehicular accident is provided. The method includes the steps of: capturing a first set of data according to a first recording criteria wherein the first data set comprises operational data for a vehicle including telematics data indicative of vehicle dynamics and contextual data indicative of location and time data; storing said first set of data in a telematics device; transmitting said first set of data to a central server; capturing a second set of data according to a second recording criteria, wherein the second set of data comprises operational data for the vehicle including telematics data indicative of vehicle dynamics and contextual data indicative of location and time data, wherein the second set of data is captured at a higher frequency than the first set of data; storing said second set of data in the telematics device, wherein the stored set of data is periodically overwritten; selectively retrieving the second set of data using an accident key in the event of an accident and transferring to the central server; determining a time of the accident by the central server based at least in part on the second set of data; and combining at least portions of the first set of data and the second set of data to evaluate conditions relating to the vehicular accident.

In another aspect of the invention, a system for retrieving and storing data relating to a vehicle accident is provided. This system includes: a plurality of sensors configured to collect operational data including telematics data indicative of vehicle dynamics and contextual data indicative of location and time; a telematics device having a first memory and a second memory wherein the first memory is configured to store a first set of data collected from the plurality of sensors according to a first criteria and the second memory is configured store to a second set of data collected from the plurality of sensors according to a second criteria, wherein further, the telematics device is configured to transfer the first set of data to a central server; an accident key configured to communicate with the telematics device and extract the second set of data following a vehicle accident and further configured to communicate the second set of data to a central server; and the central server. The central server is configured to: determine a time of the accident based at least in part on the second set of data; and combine at least portions of the first set of data and the second set of data to evaluate conditions relating to the vehicle accident.

In a further aspect of the invention, a method for evaluating a vehicle accident is provided. The method includes the steps of: receiving data relating to the operation of a vehicle involved in an accident from a telematics device including location data, operational data, and associated time data for a predetermined time period; determining an accuracy of the received data and filtering data not satisfying an accuracy threshold; and determining the time of the accident based at least in part on the received data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is a sample set of data stored in a memory module of the telematics device according to an embodiment of the present invention;

FIG. 5 is a sample set of data stored in a memory module of the telematics device according to an embodiment of the present invention;

FIG. 9 shows a sample telematics data set associated with quality indicators;

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Overview

According to various embodiments of the present invention, systems and methods are provided for capturing vehicle activity data, and in some embodiments filtering such data, to reconstruct accident conditions according to a predetermined level of accuracy.

Figure 1:
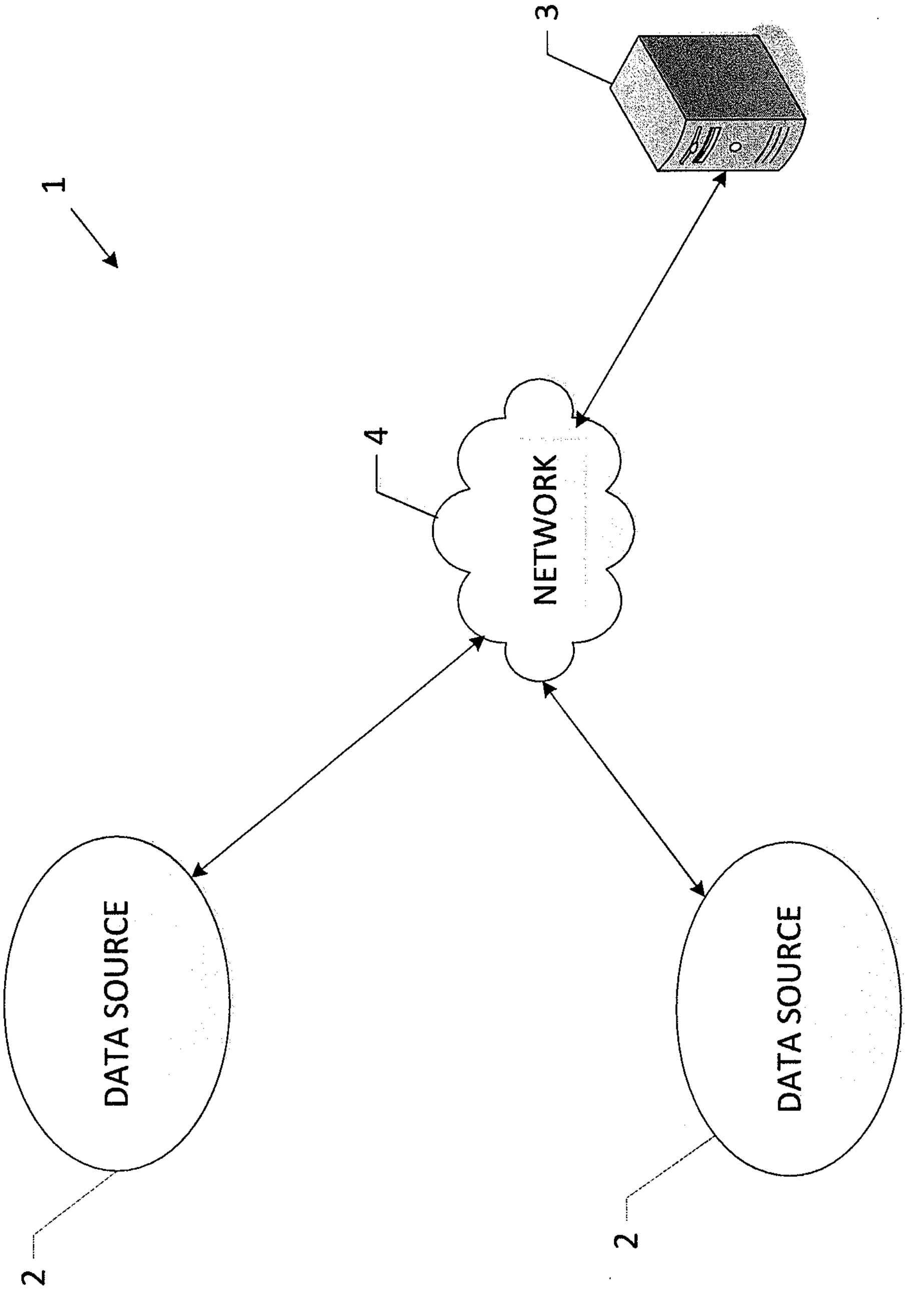
FIG. 1 is a block diagram of an accident reconstruction system according to various embodiments of the present invention.

FIG. 1 illustrates the system architecture of an accident evaluation system 1 according to various embodiments. As shown, the accident evaluation system 1 includes one or more data sources 2 and a central server 3. The data sources 2 may be, for example, devices configured for capturing and communicating operational data indicative of one or more operational characteristics (e.g., a telematics device capturing telematics data from a vehicle, a portable memory capturing a subset of telematics data from the telematics device, a computer tracking the activity of one or more users). The data sources 2 are configured to communicate with the central server 3 by sending and receiving operational data over a network 4 (e.g., the Internet, an Intranet, or other suitable networks). The central server 3 is configured to process and evaluate operational data received from the data sources 2 in accordance with user input received via a user interface (e.g., a graphical user interface provided on a local or remote computer). For example, the central server 3 may be configured for generating a graphical presentation of vehicular movement for a certain time period beginning before the time of an accident, or certain distance immediately preceding the location of an accident, in the context of other safety-indicative data.

As discussed in U.S. patent application Ser. No. 12/556,140, filed Sep. 9, 2009, which is incorporated herein by reference in its entirety, certain entities operate fleets of vehicles and may have data sources comprised of telematics devices positioned on various vehicles in the fleet. For example, a shipping entity may operate and manage a fleet of delivery vehicles, each being associated with a telematics device. The central server may be configured for processing telematics data received from any of the telematics devices in order to assess driver behaviors and also to evaluate the accuracy of such data.

In various embodiments, the accident evaluation system is also configured for evaluating operational behaviors of drivers based at least in part on data indicative of driver location and operational activity in relation to time. In such embodiments, the data sources may comprise telematics devices (i.e., GPS or RFID-based location-indicating devices embedded in the driver's vehicle) and driver input devices. The central server may be configured for evaluating data received from the location-indicating devices in order to determine whether a driver is operating a driver input device while the vehicle is in motion by associating device operation times with times reflecting change vehicle location. For example, if at a given time, the driver input device displays activity and the vehicle changes location, the central server could highlight this as an occurrence of "recording in transit", which could constitute unsafe driving behavior.

The following description provides a detailed explanation of certain embodiments of the accident evaluation system in the context of a package delivery enterprise. As will be appreciated from the detailed description herein, the various components and features of these systems may be modified and adapted to reconstruct conditions surrounding accidents and to assess driver safety-related behaviors in a variety of operational contexts.

Accident Evaluation System

According to various embodiments, accident evaluation systems are provided for capturing operational data for a fleet of vehicles, storing accident-related operational data, and evaluating the accuracy of the stored operational data. In various other embodiments, an accident evaluation system is provided for capturing operational data for a fleet of vehicles, evaluating the accuracy of the captured operational data, and storing the operational data falling within a given quality range. The accident evaluation system may further be configured to provide a graphical representation of certain operational data for a certain vehicle in relation to an accident in a way that allows system users to understand the context in which the accident occurred. As described in greater detail below, by identifying relevant, high-quality data, the system permits the long-term storage of useful data for large fleets of vehicles without overloading system storage.

System Architecture

Figure 2:
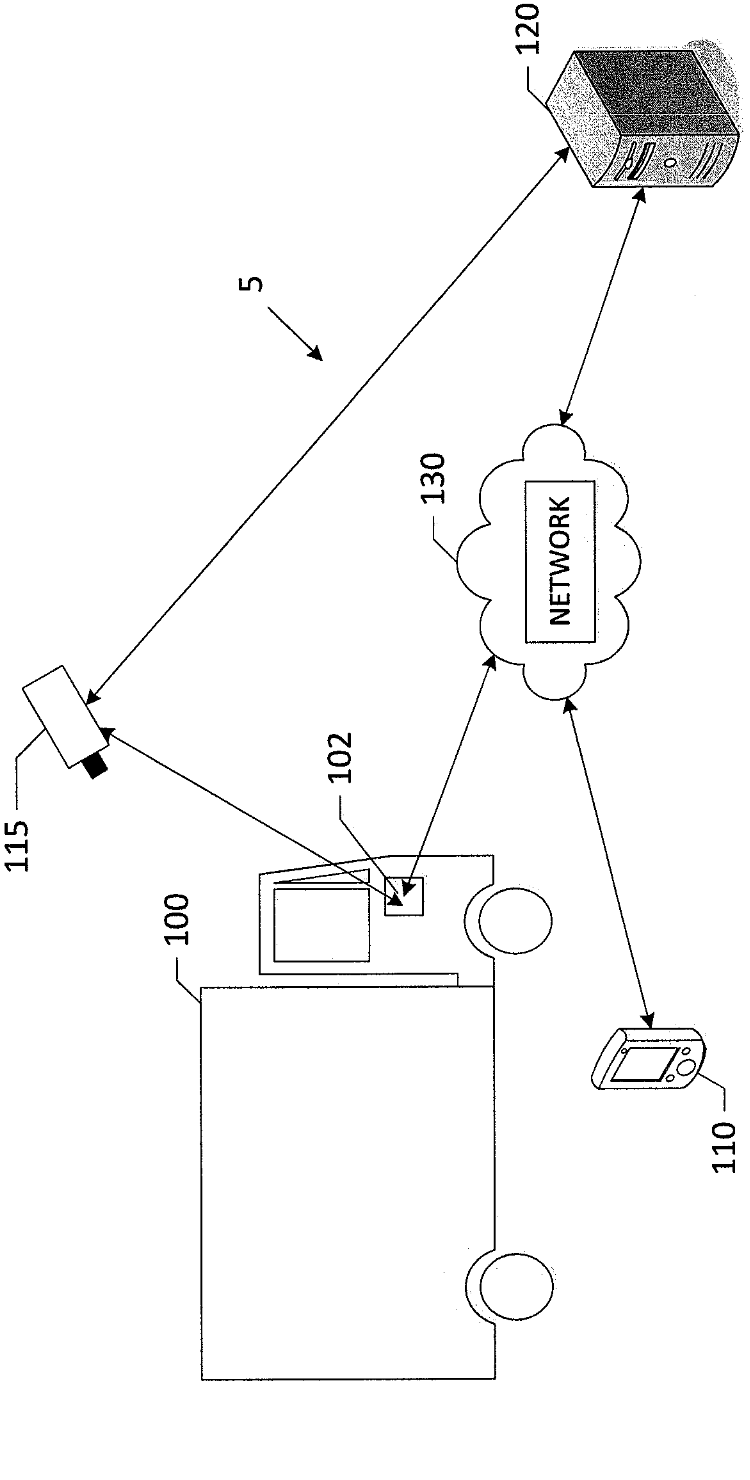
FIG. 2 is a block diagram of a fleet management system according to various embodiments of the present invention.

A data retrieval system 5 according to various embodiments is shown in FIG. 2. In the illustrated embodiment, the data retrieval system 5 comprises a vehicle telematics device 102 positioned on a delivery vehicle 100, a portable data acquisition device 110, an accident key 115, and a central server 120. The telematics device 102, portable data acquisition device 110, and central server 120 are configured to communicate with each other via a communications network 130 (e.g., the Internet, an Intranet, a cellular network, or other suitable network). The accident key 115 is configured for retrieving and storing data from the telematics device 102. In addition, the telematics device 102, portable data acquisition device 110, accident key 115, and central server 120 are configured for storing data to an accessible central server database (not shown) located on, or remotely from, the central server 120.

According to various embodiments, the data retrieval system 5 may be implemented to retrieve and store select accident-related data from a large fleet of delivery vehicles. While the detailed description of the fleet management system's components is provided below with reference to individual components or devices, it will be understood from the description herein that various embodiments of the data retrieval system 5 may include a plurality of the components each configured as described below. For example, large-scale embodiments of the data retrieval system may include thousands of telematics devices 102 and portable data acquisition devices 110, each capturing data from a unique delivery vehicle 100 or driver and transmitting the captured data to multiple servers 120.

In the illustrated embodiment of FIG. 2, the delivery vehicle 100 includes a plurality of vehicle sensors configured for generating telematics data indicative of various vehicle dynamics, such as engine ignition, engine speed, vehicle speed, steering angle, use of turn signals, and the status of various vehicle components, such as the brakes and lights. The vehicle sensors are controlled by the telematics device 102, which may be positioned on or within the vehicle 100. In various embodiments, the telematics device 102 is able to able to capture and store telematics data from the various vehicle sensors according to a programmed logic and associate the captured telematics data with contextual data (e.g., date, time, location). The captured telematics data and contextual data may then be transmitted by the telematics device 102 directly to the central server 120 via the network 130, or to the portable data acquisition device 110 (which may later transmit the data to the central server 120).

The portable data acquisition device 110 may be a handheld electronic device—such as a pocket PC, delivery information acquisition device ("DIAD"), laptop, or smartphone—that may be operated by a driver of the delivery vehicle 100. The portable data acquisition device 110 is generally configured for receiving and displaying service data such as delivery information received from the central server 120 (e.g., delivery instructions pertaining to the delivery of freight or packages), as well as for receiving and storing telematics data received from the telematics device 102. In addition, the portable data acquisition device 110 is configured for receiving and storing delivery data generated by user input (e.g., delivery data input by a driver via a user interface indicating the status of a particular delivery or driver activity, time and date of data entry, etc.). Furthermore, the portable data acquisition device 110 is configured for transmitting received data to the central server 120 and/or telematics device 102 over the network 130.

The accident key 115 is a portable storage device—such as a USB flash drive—that may be operated by the driver of the delivery vehicle 100 or by another party. The accident key 115 is generally configured for extracting and storing accident-related data received from the telematics device 102 via a USB connection. The accident key 115 is further configured for transmitting the stored accident-related data to the central server 120 via, for example, a USB connection with a computer on the network 130.

According to various embodiments, the central server 120 is generally configured for receiving and storing data from the telematics device 102, the portable data acquisition device 110, and the accident key 115. As shown in FIG. 2, the central server 120 is particularly configured for receiving and storing accident-related data from the accident key 115. Based on such accident-related data from the accident key 115, the central server is then able to amass operational data to reconstruct the accident.

In addition, the central server 120 is further configured for receiving and storing telematics data from the telematics device 102 and delivery data from the portable data acquisition device 110 over the network 130. By collecting such operational data over a period of time from various telematics devices 102 and portable data acquisition devices 110—which may be associated with a fleet of vehicles 100 and their respective drivers—the central server 120 is able to amass operational data reflecting the overall operations of the fleet. As will be described in greater detail below, the central server 120 is configured for evaluating telematics data and delivery data together, presenting the data to a user in the context of one another, and evaluating the data in a variety of ways in order to assess safety-related driver behaviors. Various components of the accident evaluation system 1 are now described in detail below according to various embodiments.

Network

According to various embodiments of the present invention, the communications network 130 may be capable of supporting communication in accordance with any one or more of a number of second-generation (2G), 2.5G and/or third-generation (3G) mobile communication protocols or the like. More particularly, the network 130 may be capable of supporting communication in accordance with 2G wireless communication protocols IS-136 (TDMA), GSM, and IS-95 (CDMA). Also, for example, the network 130 may be capable of supporting communication in accordance with 2.5G wireless communication protocols GPRS, Enhanced Data GSM Environment (EDGE), or the like. In addition, for example, the network 130 can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, the network 130 may support communication between the accident evaluation system 1 components (e.g., the telematics device 102, portable data acquisition device 110, and accident key 115) in accordance with techniques such as, for example, radio frequency (RF), Bluetooth™, infrared (IrDA), or any of a number of different wireless networking techniques, including Wireless LAN (WLAN) techniques.

Although the telematics device 102, portable data acquisition device 110, and central server 120 are illustrated in FIG. 2 as communicating with one another over the same network 130, these devices may likewise communicate over separate networks. For example, while the telematics device 102 may communicate with the portable data acquisition device 110 over a wireless personal area network (WPAN) (e.g., using Bluetooth™ techniques), the telematics device 102 and/or portable data acquisition device 110 may communicate with the central server 120 over a wireless wide area network (WWAN) (e.g., in accordance with EDGE, or some other 2.5G, 3G, or 4G wireless communication protocol).

Vehicle Sensors

As noted above, in various embodiments the delivery vehicle 100 is equipped with a variety of vehicle sensors capable of generating vehicle telematics data. For example, in one embodiment, the vehicle 100 includes sensors configured to make measurements and capture data pertaining to the following vehicle dynamics: engine ignition (e.g., on or off), engine speed (e.g., RPM and idle time events), vehicle speed (e.g., miles per hour), seat belt status (e.g., engaged or disengaged), vehicle heading (e.g., degrees from center), vehicle backing (e.g., moving in reverse or not moving in reverse), vehicle door status (e.g., open or closed), vehicle handle status (e.g., grasped or not grasped by a driver), vehicle location (e.g., latitude and longitude), distance traveled (e.g., miles between two points), throttle position, brake pedal position, parking break position, distance or time since last maintenance, and various engine measurements (e.g., engine oil pressure, engine temperature, and engine faults). In various other embodiments, the delivery vehicle 100 may include any combination of the above-referenced sensors (and additional sensors known in the art) depending on the operational data desired by a fleet management system 5 user.

According to various embodiments, the vehicles sensors disposed within the delivery vehicle 100 comprise on/off sensors, which register a voltage amount that corresponds with an on/off condition. For example, in one embodiment, a seat belt sensor may register 0V when the seat belt is disengaged and 12V when the seat belt is engaged. Such on/off sensors are sufficient for measuring vehicle dynamics in which operational data is needed to indicate two conditions, such as a seat belt, which is either engaged or disengaged at all times. As another example, one or more door position sensors may be connected, for example, to the driver side, passenger side, and bulkhead doors, and may register 0V when the door with which the sensor is associated is in an open position, and 12V when the door is closed. As another example, an ignition sensor may register 0V when the vehicle 100 is turned off and 12V when the vehicle 100 is turned on. As yet another example, a backing light sensor may register 0V when the vehicles' backing lights are off and 12V when the vehicle's backing lights are on. As yet another example, the engine idle sensor may be configured to generate 0V when the engine speed is above idle and 12V when the engine is idling.

In addition, according to various embodiments, the vehicle sensors disposed within the delivery vehicles 100 also comprise variable voltage sensors, which may be used to register variations in voltage reflecting a certain vehicle dynamic. For example, the engine speed sensor may detect the speed of the engine in revolutions per minute (RPM) by registering a particular voltage that corresponds to a particular RPM reading. The voltage of the sensor may increase or decrease proportionately with increases or decreases in the engine RPM. As another example, oil pressure sensors may detect the vehicle's oil pressure by registering a particular voltage that corresponds to a particular oil pressure. Other examples of variable voltage sensors may include temperature sensors, vehicle speed sensors, vehicle heading sensors, and vehicle location sensors.

The exemplary vehicle sensors described above may be configured, for example, to operate in any fashion suitable to generate computer-readable data that may be captured, stored, and transmitted by the telematics device 102. In addition, while certain sensors are preferably disposed at particular locations on or within the vehicles 100 (e.g., handle sensors at the vehicle handles), other sensors may be disposed anywhere within the vehicle, such as within the telematics device 102 itself (e.g., a location sensor).

Telematics Device

As noted above, according to various embodiments, the telematics device 102 is configured to control various vehicle sensors positioned on an associated delivery vehicle 100, capture vehicle telematics data generated by those sensors, and/or transmit the captured telematics data to the portable data acquisition device 110 and/or central server 120 via one of several communication methods. According to various embodiments, the various functions of the telematics device 102 described herein may be generally understood as being performed by one or more of the telematics device 102 components described below.

Figure 3:
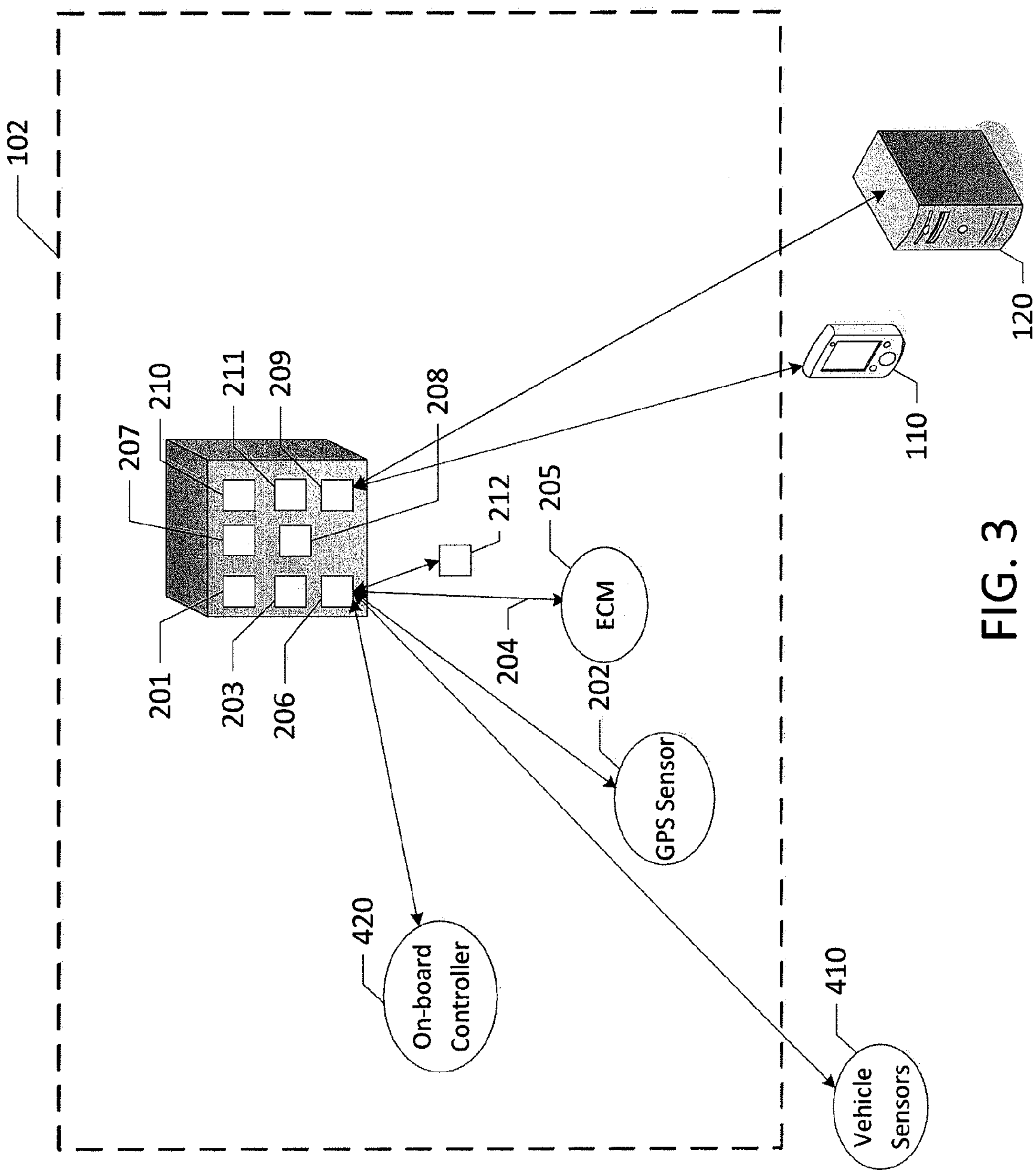
FIG. 3 is a block diagram of a telematics device according to one embodiment of the present invention.

FIG. 3 illustrates a detailed schematic block diagram of an exemplary telematics device 102 according to one embodiment. In the illustrated embodiment, the telematics device 102 includes the following components: a processor 201, a location-determining device or sensor 202 (e.g., GPS sensor), a real-time clock 203, J-Bus protocol architecture 204, an electronic control module (ECM) 205, a port 206 for receiving data from vehicle sensors 410 located in one of the delivery vehicles 100 (shown in FIG. 2), a communication port 207 for receiving instruction data, a radio frequency identification (RFID) tag 212, a power source 208, a data radio 209 for communication with a general memory module 210, and a short-term memory module 211. In an alternative embodiment, the RFID tag 212 and the location sensor 202, may be located in the delivery vehicle 100, external from the telematics device 102. In other embodiments, the processes described herein as being carried out by a single processor 201 may be accomplished by multiple processors. In various embodiments, the telematics device 102 may not include certain of the components described above, and may include any other suitable components in addition to, or in place of, those described above. For example, the telematics device 102 may include various types of communications components other than those described above (e.g., to support new or improved communications techniques).

In one embodiment, the location sensor 202 may be one of several components available in the telematics device 102. The location sensor 202 may be, for example, a GPS-based sensor compatible with a low Earth orbit (LEO) satellite system, medium Earth orbit satellite system, or a Department of Defense (DOD) satellite system. Alternatively, triangulation may be used in connection with various cellular towers positioned at various locations throughout a geographic area in order to determine the location of the delivery vehicle 100 and/or its driver. The location sensor 202 may be used to receive position, time, and speed data. In addition, the location sensor 202 may be configured to detect when its delivery vehicle 100 has entered or exited a GPS-defined geographic area (e.g., a geo-fenced area). As will be appreciated from the description herein, more than one location sensor 202 may be utilized, and other similar techniques may likewise be used to collect geo-location information associated with the delivery vehicle 100 and/or its driver.

In one embodiment, the ECM 205 with J-Bus protocol 204 may be one of several components available in the telematics device 102. The ECM 205, which may be a scalable and subservient device to the telematics device 102, may have data processor capability to decode and store analog and digital inputs and ECM data streams from vehicle systems and sensors 410, 420. The ECM 205 may further have data processing capability to collect and present vehicle data to the J-Bus 204 (which may allow transmittal to the telematics device 102), and output standard vehicle diagnostic codes when received from a vehicle's J-Bus-compatible on-board controllers 420 or vehicle sensors 410.

In one embodiment, the instruction data receiving port 207 may be one of several components available in the telematics device 102. Embodiments of the instruction data receiving port 207 may include an Infrared Data Association (IrDA) communication port, a data radio, and/or a serial port. The instruction receiving data port 207 may receive instructions for the telematics device 102. These instructions may be specific to the vehicle 100 in which the telematics device 102 is installed, specific to the geographical area in which the vehicle 100 will be traveling, or specific to the function the vehicle 100 serves within the fleet.

In one embodiment, a radio frequency identification (RFID) tag 212 may be one of several components available for use with the telematics device 102. One embodiment of the RFID tag 212 may include an active RFID tag, which comprises at least one of the following: (1) an internal clock;

(2) a memory; (3) a microprocessor; and (4) at least one input interface for connecting with sensors located in the vehicle 100 or the telematics device 102. Another embodiment of the RFID tag 212 may be a passive RFID tag. One or more RFID tags 212 may be internal to the telematics device 102, wired to the telematics device 102, and/or proximate to the telematics device 102. Each RFID tag 212 may communicate wirelessly with RFID interrogators within a certain geographical range of each other. RFID interrogators may be located external to the vehicle 100 and/or within the portable data acquisition device 110 that can be carried in and out of the vehicle 100 by the vehicle operator.

In one embodiment, the data radio 209 may be one of several components available in the telematics device 102. The data radio 209 may be configured to communicate with a WWAN, WLAN, or WPAN, or any combination thereof. In one embodiment, a WPAN data radio provides connectivity between the telematics device 102 and peripheral devices used in close proximity to the vehicle 100, such as the portable data acquisition device 110, a local computer, and/or a cellular telephone. As mentioned above, in one embodiment of the invention, a WPAN, such as, for example, a Bluetooth™ network (IEEE 802.15.1 standard compatible) may be used to transfer information between the telematics device 102 and the portable data acquisition device 110. In other embodiments, WPANs compatible with the IEEE 802 family of standards may be used. In one embodiment, the data radio 209 may be a Bluetooth™ serial port adapter that communicates wirelessly via WPAN to a Bluetooth™ chipset located in the portable data acquisition device 110, or other peripheral device. In addition, a Media Access Control (MAC) address, which is a code unique to each Bluetooth™-enabled device that identifies the device, similar to an Internet protocol address identifying a computer in communication with the Internet, can be communicated to other devices in communication with the WPAN, which may assist in identifying and allowing communication among vehicles, cargo, and portable data acquisition devices equipped with Bluetooth™ devices. As discussed above with regard to FIG. 2, and as one of ordinary skill in the art will readily recognize, other wireless protocols exist (e.g., cellular technology) and can likewise be used in association with embodiments of the present invention.

As described in greater detail below, in various embodiments, the telematics device 102 is configured to capture and store telematics data from the vehicle sensors 410 at predefined time intervals and in response to detecting the occurrence of one or more of a plurality of predefined vehicle events. Generally, a vehicle event may be defined as a condition relating to any parameter or combination of parameters measurable by the one or more vehicle sensors 410 (e.g., the engine idling, vehicle speed exceeding a certain threshold, etc.). As such, the telematics device 102 is configured to continuously monitor the various vehicle sensors 410 and detect when the data being generated by one or more the vehicle sensors 410 indicates one or more of the plurality of predefined vehicle events. In response to detecting a vehicle event, the telematics device 102 captures data from all of the vehicle sensors 410 or a particular subset of the vehicle sensors 410 associated with the detected vehicle event.

As an example, the telematics device 102 may be configured to recognize the occurrence of a first vehicle event (e.g., the vehicle's 100 engine being turned on or off), a second vehicle event (e.g., the vehicle's 100 speed exceeding a certain threshold), and a third vehicle event (e.g., a seat belt in the vehicle 100 being engaged or disengaged). In one embodiment, the telematics device 102 is configured to capture and store telematics data from all of the vehicle sensors 410 in response to detecting any of the first vehicle event, the second vehicle event, and the third vehicle event. In another embodiment, the telematics device 102 is further configured such that the first vehicle event is associated with a first subset of vehicle sensors (e.g., the seat belt sensor and location sensor), the second vehicle event is associated with a second subset of vehicle sensors (e.g., a vehicle speed sensor and location sensor), and the third vehicle event is associated with a third subset of vehicle sensors (e.g., a seat belt sensor, engine speed sensor, and vehicle speed sensor). Accordingly, in this embodiment, the telematics device 102 will capture and store telematics data from the first set of vehicle sensors upon detecting the first vehicle event, the second set of vehicle sensors upon detecting the second vehicle event, and the third set of vehicle sensors upon detecting the third vehicle event.

The vehicle events programmed for recognition by the telematics device 102 can be defined in a variety of ways. As will be appreciated from the description herein, the telematics device 102 may be configured to capture telematics data in response to vehicle events defined by any combination of conditions sensed by the vehicle sensors 410. These predefined vehicle events may be stored, for example, on the telematics device's general memory module 210, or on another data storage medium accessible by the telematics device's processor 201.

For example, in various embodiments, the telematics device 102 is configured to recognize vehicle events characterized by data generated by on/off vehicle sensors. These vehicle events include: (a) a vehicle's engine being turned on, (b) a vehicle's engine being turned off, (b) a vehicle door opening, (c) a vehicle door closing, (d) a vehicle door being locked, (e) a vehicle door being unlocked, (f) a vehicle's reverse gear being selected, (g) a vehicle's one or more forward drive gears being selected, (h) a vehicle's neutral or park gear being selected, (i) a vehicle's parking break being engaged, (j) a vehicle's seat belt being engaged, (k) a vehicle's seat belt being disengaged, and any other event definable by a parameter measured by an on/off sensor.

In addition, various embodiments of the telematics device 102 are also configured to recognize vehicle events characterized by data generated by variable voltage vehicles sensors or other types of dynamic vehicle sensors. These vehicle events include (a) a vehicle's speed increasing from standstill to a non-zero value, (b) a vehicle's speed decreasing from a non-zero value to standstill, (c) a vehicle's engine speed exceeding a certain threshold, (d) a vehicle's engine speed dropping below a certain threshold, (e) a vehicle beginning to move in a reverse direction, (f) a vehicle ceasing to move in a reverse direction, (g) a vehicle's heading reaching a threshold away from center, (h) a vehicle's engine temperature exceeding a certain threshold, (i) a vehicle's gas level falling below a certain level, (j) a vehicle's speed exceeding a certain threshold, and any other event definable by a parameter measured by a variable voltage or other dynamic sensor.

According to various embodiments, the telematics device 102 may be also configured to recognize multiple unique vehicle events based on a single varying parameter measured by one of the vehicle sensors 410. As one example, the telematics device 102 may be configured such that a first vehicle event is detected anytime the vehicle's speed begins to exceed 50 miles-per-hour, while a second vehicle event is detected anytime the vehicle's speed begins to exceed 70 miles-per-hour. As such, the telematics device 102 may capture telematics data from vehicle sensors 410 in response to the vehicle 100 accelerating past 50 miles-per-hour, and again as the vehicle 100 accelerates past 70 miles-per-hour. In addition, as noted earlier, the telematics device 102 may capture telematics data from unique subsets of vehicle sensors based on the varying measurements of vehicle speed (e.g., a first subset of vehicles sensors associated with the 50-mph vehicle event and a second subset of vehicle sensors associated with the 70-mph vehicle event). This concept may also be applied to other variable parameters sensed by vehicle sensors, such as vehicle heading (e.g., various threshold degrees from center), engine speed (e.g., various threshold RPM measurements), and vehicle distance from a predefined path (e.g., threshold value for feet from a known road, vehicle route, or other GPS-based geographic location).

In addition, vehicle events may be defined by a combination of conditions indicated by various vehicle sensors 410. For example, in certain embodiments, the telematics device 102 is configured to detect (a) where a vehicle seat belt is engaged or disengaged while the vehicle is idling, (b) where a vehicle exceeds a certain speed while located within a certain geographic area associated with the certain speed, and (c) a vehicle door opening or closing while the engine is on.

In addition to capturing telematics data in response to detected vehicle events, the telematics device 102 may be further configured to automatically capture telematics data from the vehicle sensors 410 at predefined time intervals. For example, in one embodiment, the telematics device 102 is programmed with a maximum data capture time (e.g., 10 seconds, one minute) and is configured to automatically capture telematics data from the vehicle sensors 410 where no vehicle events are detected for a period exceeding the defined time. This configuration ensures that the maximum data capture time is the longest possible duration between telematics data being collected and ensures that the vehicle 100 is continuously monitored even through periods where none of the predefined vehicle events are detected. As will be appreciated from the description herein, the maximum data capture time may be defined as any period of time according to the preference of a fleet management system 5 user.

As noted above, in response to a triggering event—such as defined vehicle event or elapsed maximum data capture time—the telematics device 102 captures telematics data from the vehicle sensors 410. In one embodiment, the telematics device 102 is configured to store the captured telematics data in fields of one or more data records, each field representing a unique measurement or other data from a unique vehicle sensor. As the telematics device 102 continues to capture telematics data in response to triggering events, multiple records of data comprising multiples sets of concurrently captured telematics data are amassed.

The telematics data captured according to combinations of the parameters described above (i.e., in response to certain of the stated vehicle events and also according to the maximum data capture time) is stored collectively in the telematics device's general memory module 210. In various other embodiments, this collective data can be stored on another data storage medium accessible by the telematics device's processor 201. FIG. 4 depicts a sample set of the telematics data 45 stored in the telematics device's general memory module 210.

Furthermore, the telematics device 102 also maintains a continuously overwritten set of high-resolution telematics data 55 that can be downloaded via the accident key 115 in the event of an accident. This high-resolution telematics data 55 is stored in the telematics device's short-term memory module 211, or another data storage medium accessible by the telematics device's processor 201. The short-term memory module stores data only temporarily. For example, in various embodiments of the present invention, the short-term memory module 211 is configured to store an hour's worth of one-second interval recordings of data. After one hour's worth of one-second data is recorded, the next data record will overwrite the oldest data in the set, so that the record will always reflect the last hour of data.

In various embodiments, upon capturing data from any of the vehicle sensors 410, the telematics device 102 is further configured to concurrently capture and store contextual data. The contextual data may include, for example, the date (e.g., 12/30/10) and time (e.g., 13:24) the data was captured, the vehicle from which the data was captured (e.g., a vehicle identification number such as 16234), the driver of the vehicle from which the data was captured at the time it was captured (e.g., John Q. Doe), a logged reason for the data capture (e.g., a code indicating a detected vehicle event or indicating that the predefined time interval had elapsed), and/or quality-related indicators. The contextual data may be captured, for example, from various telematics device components (e.g., an internal clock) and from data stored on the telematics device 102 (e.g., current driver name, current vehicle id, or various vehicle event codes). Further, the telematics device 102 is configured to associate the captured telematics data with the captured contextual data in order to ensure concurrently captured telematics data and contextual data are linked. For example, in one embodiment, the telematics device 102 stores concurrently captured telematics data and contextual data in the same data record or records.

As noted above, the telematics device 102 is also configured to transmit captured telematics data and contextual data to the portable data acquisition device 110 and/or the central server 120.

Accident Key

As noted above, the accident key 115 may be a portable storage device—such as a USB flash drive—that may be operated by the driver of the delivery vehicle 100 or by another party. For example, a company responsible for a large fleet of vehicles may have supervisors or accident response members assigned to monitor each region or group of vehicles. The supervisor or accident response member assigned to a particular vehicle would then be called, following an accident, to retrieve the accident data from the vehicle following an accident.

In various embodiments, the accident key 115 is comprised of a connective portion (e.g., a USB connection) and a memory portion. The accident key 115 is programmed so that, upon insertion of the connective portion of the accident key 115 into a corresponding port in the delivery vehicle 100 or telematics device, the high-resolution vehicle data 55 is extracted from the telematics device's the short-term memory module 211 and downloaded to the memory portion of the accident key 115. In various embodiments, the accident key 115 is programmed to associate this set of high-resolution data 55 with a marker that signifies it as accident-related data. The accident key 115 is further configured for transmitting the stored accident-related data to the central server 120 via, for example, a USB connection with a computer on the network 130. In various embodiments, each data record in the set of high-resolution vehicle data 55 contains or is associated with a vehicle identifier and a date/time stamp. In this way, the high-resolution vehicle data 55 can later be integrated with other data specific to the vehicle.

Central Server

As noted above, various embodiments of the central server 120 are generally configured for receiving and evaluating telematics data received from the telematics device 102, delivery data received from the portable data acquisition device 110, and accident-related data received from the accident key 115 for a vehicle in order to reconstruct conditions of an accident and assess driver safety. According to various embodiments, the central server 120 includes various means for performing one or more functions in accordance with embodiments of the present invention, including those more particularly shown and described herein. As will be appreciated from the description herein, however, the central server 120 may include alternative devices for performing one or more like functions without departing from the spirit and scope of the present invention.

Figure 6:
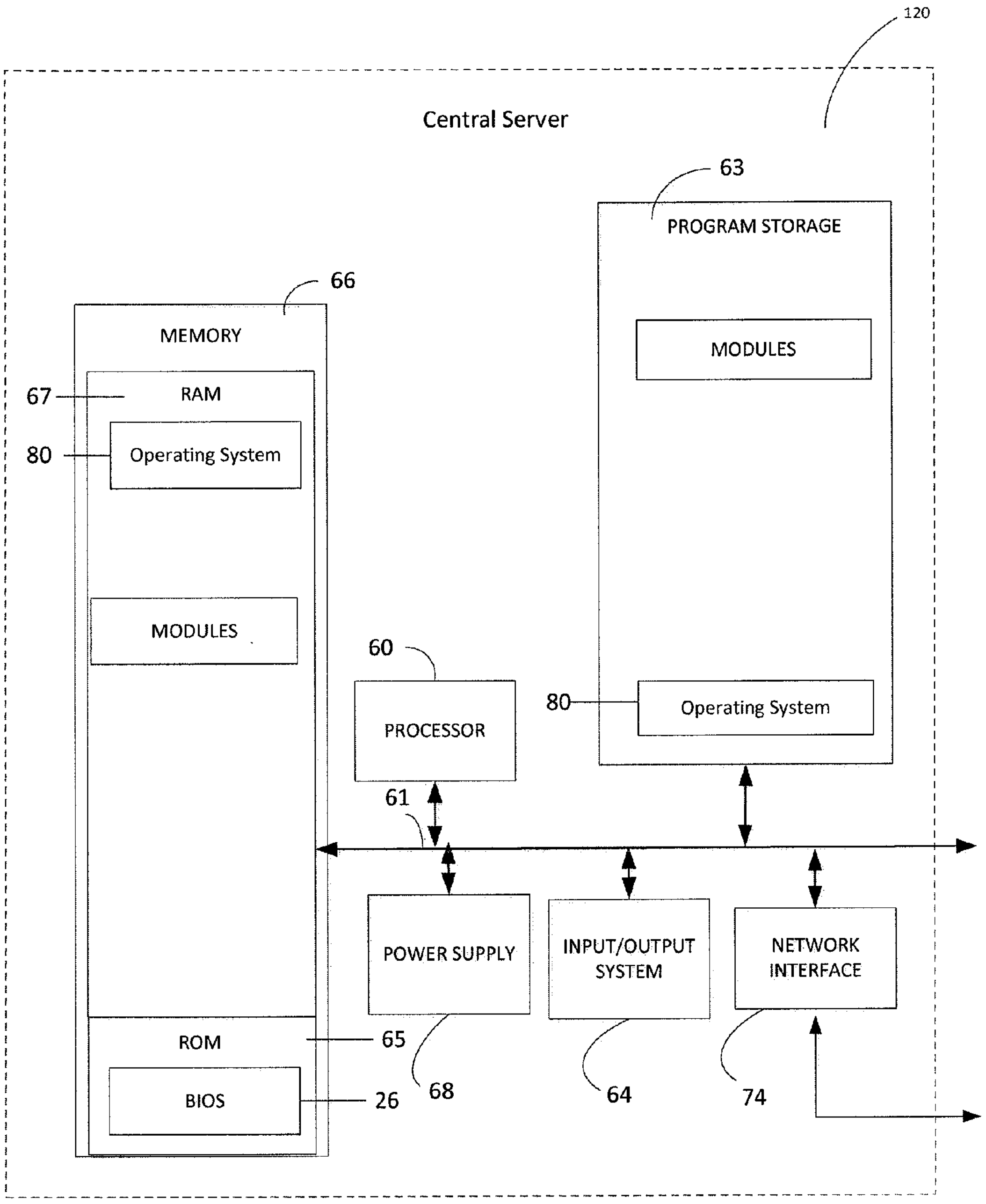
FIG. 6 is a schematic block diagram of a central server according to one embodiment of the present invention.

FIG. 6 illustrates a schematic diagram of the central server 120 according to various embodiments. The central server 120 includes a processor 60 that communicates with other elements within the central server 120 via a system interface or bus 61. In the illustrated embodiment, the central server 120 includes a display device/input device 64 for receiving and displaying data. This display device/input device 64 may be, for example, a keyboard or pointing device that is used in combination with a monitor. In certain embodiments, the central server 120 may not include a display device/input device and may be alternatively accessed by a separate computing device (e.g., a networked workstation) having a display device and input device. The central server 120 further includes memory 66, which preferably includes both read only memory (ROM) 65 and random access memory (RAM) 67. The server's ROM 65 is used to store a basic input/output system 26 (BIOS), containing the basic routines that help to transfer information between elements within the central server 120.

In addition, the central server 120 includes at least one storage device 63—such as a hard disk drive, a floppy disk drive, a CD Rom drive, or optical disk drive—for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 65. Such program modules may include a data filtration module, an accident reconstruction module, and a driver safety module. According to various embodiments, the modules control certain aspects of the operation of the central server 120 with the assistance of the processor 60 and an operating system 80. Embodiments of these modules are described in more detail below.

In a particular embodiment, these program modules are executed by the central server 120 and are configured to generate graphical user interfaces accessible to users of the system. In one embodiment, the user interfaces may be accessible via the Internet or other communications network. In other embodiments, one or more of the modules may be stored locally on one or more computers and executed by one or more processors of the computers.

According to various embodiments, the central server 120 is configured to send data to, receive data from, and utilize data contained in a central server database, which may be comprised of one or more separate, linked databases. For example, in executing the various modules, the central server 120 may retrieve data necessary for performing various analyses from the central server database, and may store data resulting from various analyses in the central server database. According to various embodiments, the central server database may be a component of the central server 120, or a separate component located remotely from the central server 120. In addition, the central server database may be configured for storing data in various data sets. In various embodiments, each data set may comprise a plurality of stored data records, each record (or set of associated records) comprising one or more data fields of unique data entries. For example, telematics data and contextual data concurrently captured by the telematics device 102 may be stored in a data record, where each data field in the data record represents a unique data entry (e.g., a measurement of vehicle speed, GPS coordinates, the time and date the data was captured, and an ID number of the vehicle from which the data was captured).

Also located within the central server 120 is a network interface 74, for interfacing and communicating with other elements of a computer network. It will be appreciated by one of ordinary skill in the art that one or more of the central server 120 components may be located geographically remotely from other central server 120 components. Furthermore, one or more of the components may be combined, and additional components performing functions described herein may be included in the central server 120.

While the foregoing describes a single processor 60, as one of ordinary skill in the art will recognize, the central server 120 may comprise multiple processors operating in conjunction with one another to perform the functionality described herein. In addition to the memory 66, the processor 60 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface. The user input interface, in turn, can comprise any of a number of devices allowing the entity to receive data from a user, such as a keypad, a touch display, a joystick or other input device.

While reference is made to a central "server" 120, as one of ordinary skill in the art will recognize, embodiments of the present invention are not limited to a client-server architecture. The system of embodiments of the present invention is further not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), or similar electronic devices, collaborating with one another to provide the functionality described herein in association with the central server 120 may likewise be used without departing from the spirit and scope of embodiments of the present invention.

Central Server User Interface

As described above, the central server 120 is configured for evaluating operational data (e.g., telematics, portable device operation, and accident data) for a fleet of vehicles in order to assess driver behaviors in the context of operational safety. According to various embodiments, the central server's 120 evaluation of operational data is conducted in accordance with user instructions received via the central server's user interface. In various embodiments, the user interface is a graphical user interface accessible from a remote workstation (e.g., in communication with the central server 120 via the network 130), or by using the central server's display device/input device 64.

For example, in various embodiments, a user may log in to the accident evaluation system 1 from a remote workstation (e.g., by opening a log-in page and entering a user id and password using a workstation display and keyboard). The central server 120 is configured to recognize any such log-in request, verify that user has permission to access the system (e.g., by confirming the user id and password are valid), and present the user with a graphical user interface (e.g., displayed on the workstation's monitor). From the graphical user interface, the user can access and run any of the modules described below.

GPS Records

Figure 12:
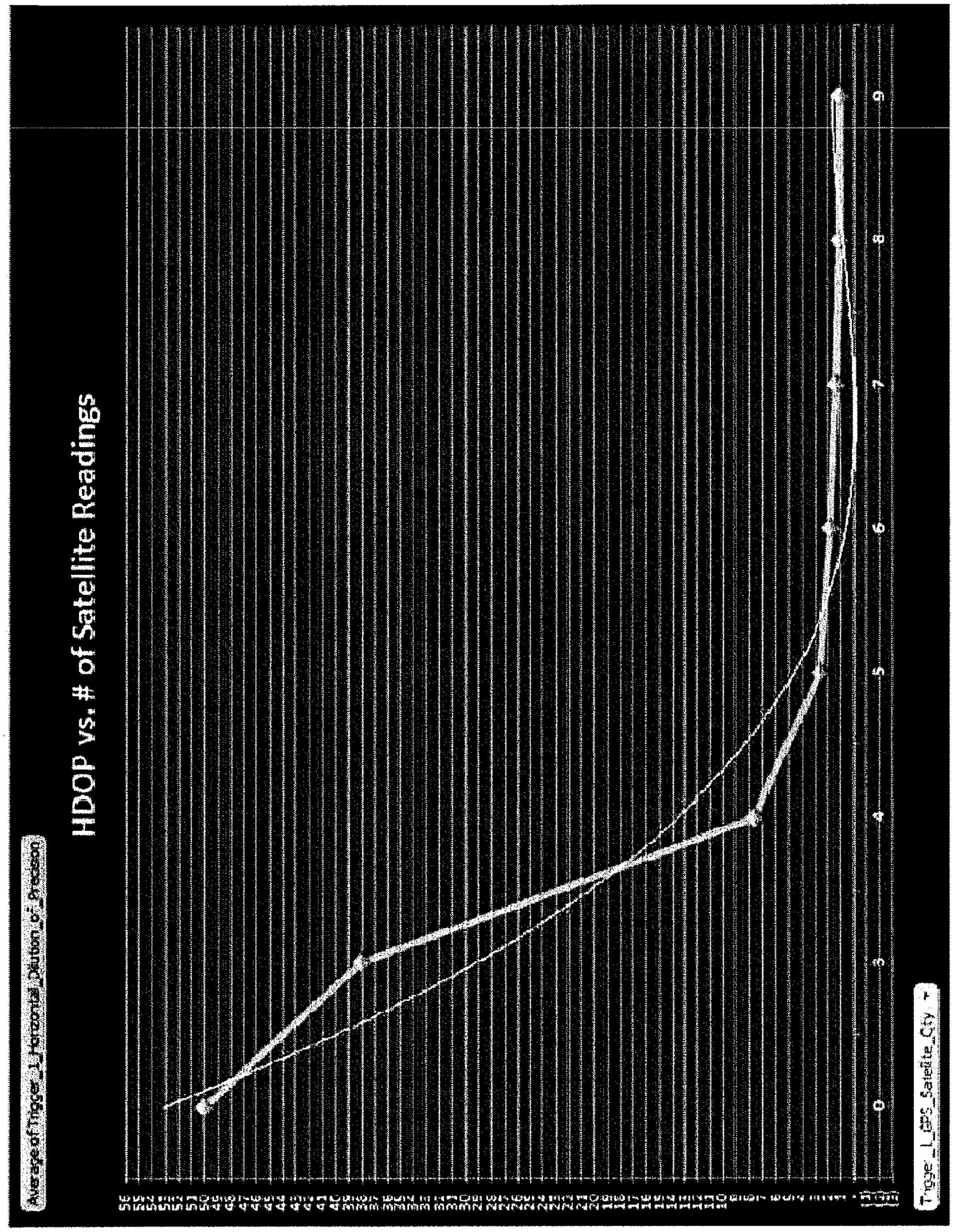
FIG. 12 illustrates the relationship between HDOP versus the number of satellite readings.

As noted above, the telematics data received from the telematics device 102, the delivery data received from the portable data acquisition device 110, and the accident-related data received from the accident key 115 may each include GPS records. Each GPS record contains a time component, a location component, and a set of data quality indicators. The data quality indicators in various embodiments of the present invention may include: signal-to-noise ratio (SNR), number of satellites, signal strength, horizontal dilution of precision (HDOP), and vertical dilution of precision (VDOP). FIG. 12 demonstrates, based on a sample set of GPS records, that the number of satellites used to calculate a particular GPS reading is positively correlated with the associated HDOP value. As can be seen, as the number of satellites increases, the HDOP values decrease indicating a greater level of precision.

Data Filtration Module

According to various embodiments, the data filtration module is generally configured for filtering out GPS records based on a predetermined threshold of precision. In various embodiments, the data filtration module accesses one or more data quality indicators associated with a GPS record to determine the level of precision of the GPS record. The level of precision required may vary depending on the particular function of the data. Therefore, in various embodiments, the data filtration module may be configured to prompt a user to enter or select a value or range of values representative of a degree of precision. Alternatively, the data filtration module may be configured to automatically select a value or range of values in response to a user selection of a particular data function (e.g., safety monitoring, accident reconstruction, etc.).

In various embodiments of the present invention, data is filtered based on HDOP values alone. It is generally understood that HDOP values closest to 1.0 are ideal, and values between 1.0 and 2.0 are accurate for use in most applications. For example, the data filtration module may be configured to filter out any GPS-related data records where the HDOP value is greater than 5.0 when a user is accessing data for the purposes of evaluating a driver's safety. A higher threshold of precision is required for data used to reconstruct an accident sequence versus for data used to generally evaluate driver safety, in light of the fact that the data in the context of an accident is evaluated in terms of relation to other vehicles and/or objects, and data in the context of safety can typically be evaluated on a more general level. Therefore, in various embodiments of the present invention, when a user is accessing data for the purposes of reconstructing an accident sequence, the data filtration module may filter out any GPS-related data records where the HDOP value is, for example, greater than 3.0. Furthermore, when the data records are being used for an evidentiary purpose, such as, for example, in apportioning liability regarding an accident, an even higher degree of precision may be desired or even required by the decision-making authority. Therefore, the data filtration module in various embodiments may be configured to filter out GPS records associated with an HDOP value greater than 2.0, for example, when the data is being accessed for an accident-related evidentiary purpose.

Accident Reconstruction Module

According to various embodiments, the accident reconstruction module is generally configured for providing information pertaining to the details of a vehicle's travel path in the moments preceding an accident. In particular, referring briefly to FIG. 8, the accident reconstruction module generates the vehicle travel path on a user interface's map display 810 and view information derived from operational data captured as the vehicle traveled along a portion of the travel sequence leading to the accident.

Figure 7:
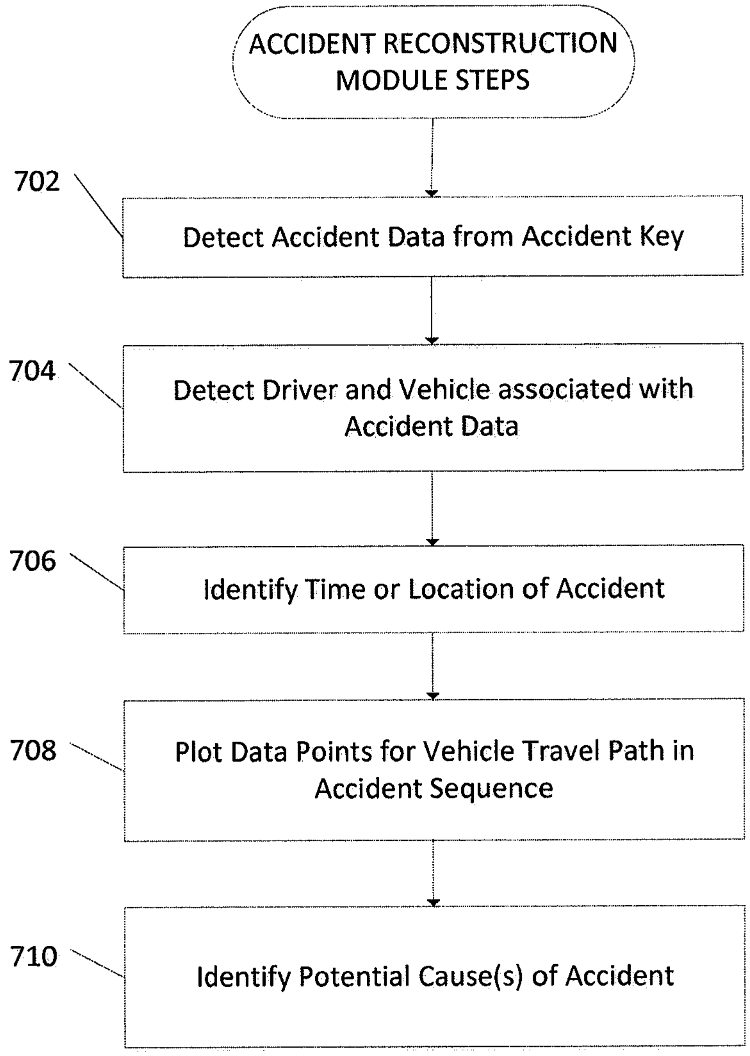
FIG. 7 is a flow chart of steps carried out by the accident reconstruction module.

FIG. 7 illustrates the steps executed by the accident reconstruction module according to one embodiment. Beginning at step 702, the accident reconstruction module detects accident data, for instance, when data from an accident key is uploaded to the central server. As noted above, data extracted from the telematics device in a vehicle and downloaded to an accident key can be flagged as being accident-related. Next, at step 704, the accident reconstruction module identifies the driver ID and vehicle ID associated with the accident data.

Then, in various embodiments, in step 706, the accident reconstruction module determines the time of the accident. In various embodiments of the present invention, the time of the accident may be determined by manual entry (e.g., if the driver noted the time of impact) or by the presence of certain data "flags" in the accident data (e.g., records associated with harsh braking or sudden vehicle movement signifying impact, etc.).

Next, in step 708, the accident reconstruction module creates a geographical representation of the vehicle's movement in the accident sequence. In particular, the accident reconstruction module plots GPS points falling within a predetermined period of time leading up to the time of the accident. The GPS points are obtained from a combination of telematics data stored on the central server and accident data from the accident key. For example, as shown in FIG. 5, by using the time stamp as a reference point, accident data can be used to supplement telematics data to create the most comprehensive set of GPS data available.

Figure 8:
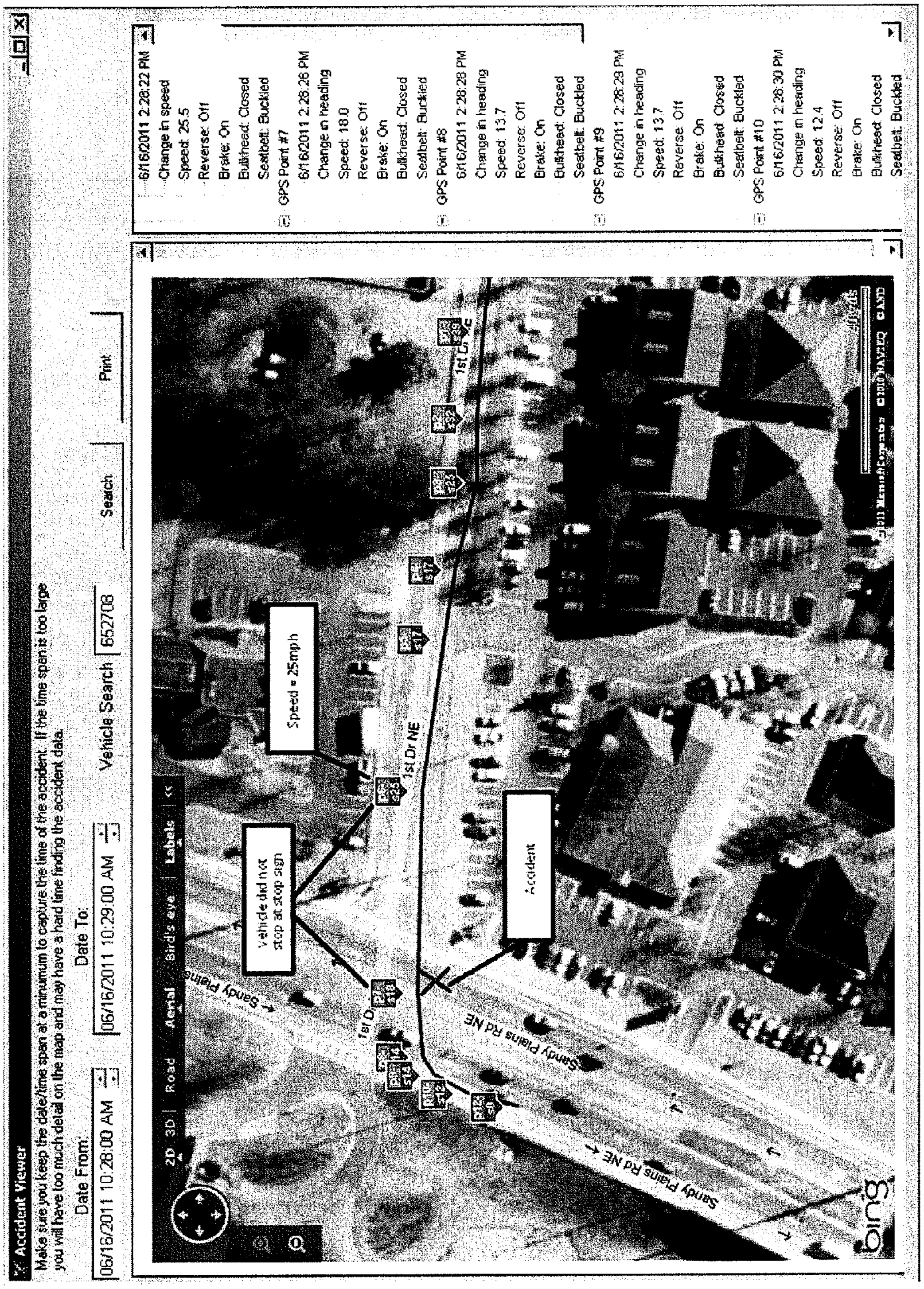
FIG. 8 shows an accident reconstruction user interface according to one embodiment of the present invention.
Figure 10:
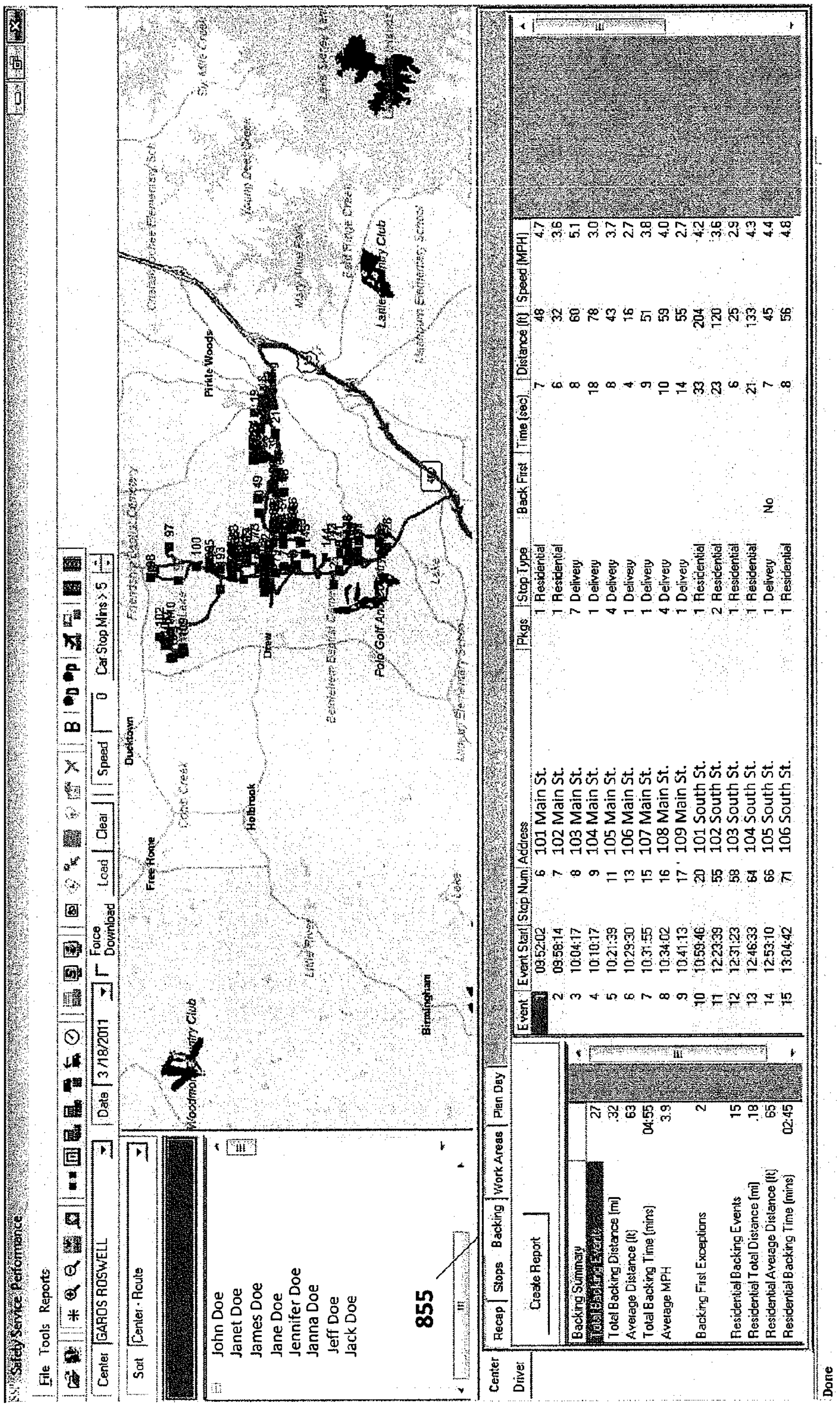
FIG. 10 shows a driver safety user interface according to one embodiment of the present invention.
Figure 11:
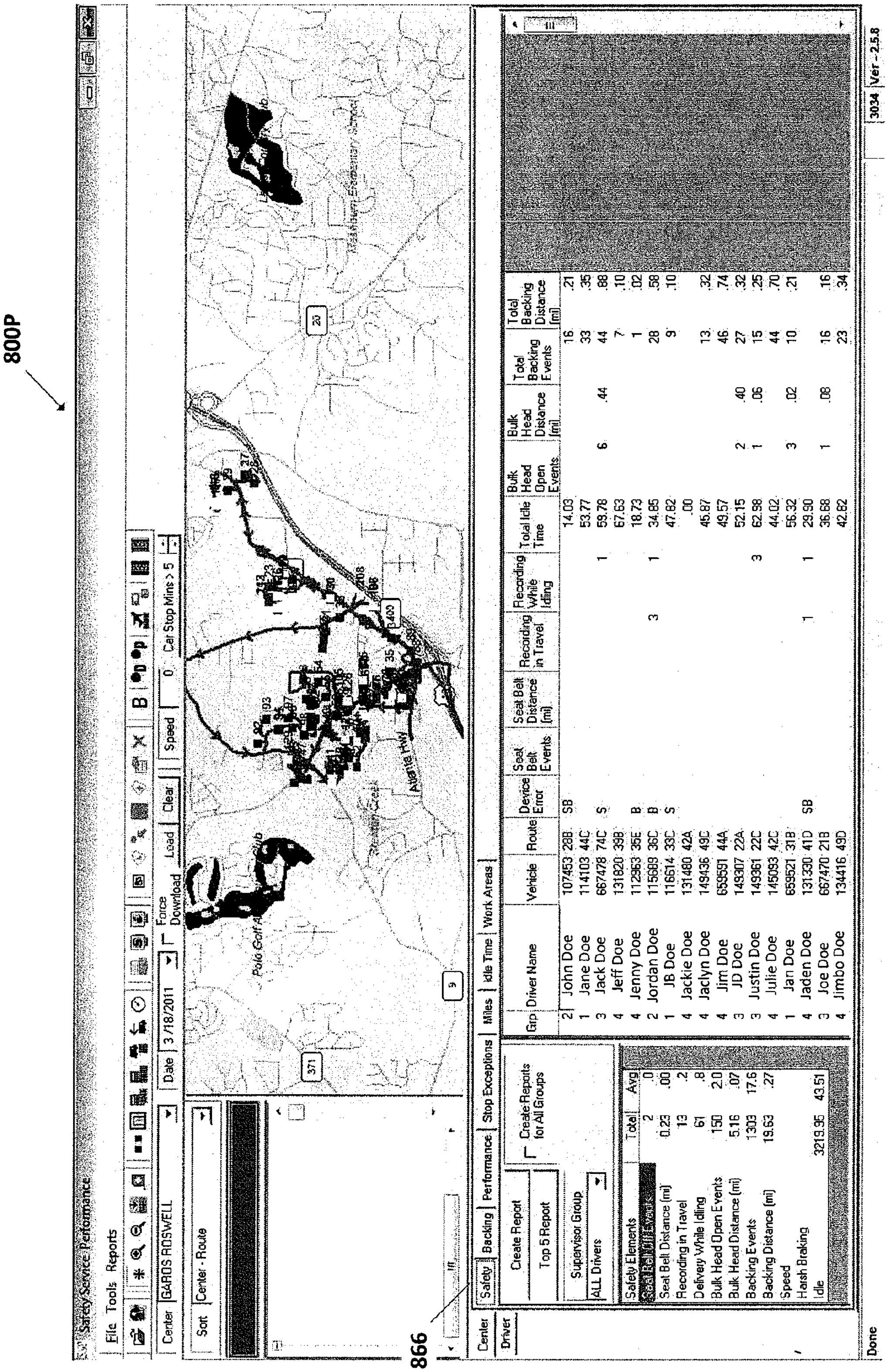
FIG. 11 shows a location safety user interface according to one embodiment of the present invention.

In addition, as shown in FIG. 8, the accident reconstruction module may associate additional data with the GPS points that could be relevant for accident reconstruction (e.g., change in heading, speed, and reverse, brake, bulkhead, and seatbelt statuses).

In various embodiments, the data points for the travel sequence may have already been subjected to filtration for quality control, as described above with respect to the data filtration module. Therefore, a user assessing an accident sequence can be confident that the depicted sequence and corresponding data meets a certain degree of precision. In step 710, the accident reconstruction module is configured to identify accident-prone conditions based on the GPS points and related data. For instance, in various embodiments, the accident reconstruction module may be configured to flag instances where the vehicle is traveling at a certain level over the speed limit or any predetermined speed deemed to be "safe" in the conditions. In other embodiments, step 710 can be carried out manually.

Conclusion

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for evaluating data relating to a vehicular accident comprising the steps of:

capturing a first set of data according to a first recording criteria wherein the first data set comprises operational data for a vehicle including telematics data indicative of vehicle dynamics and contextual data indicative of location and time data;

storing said first set of data in a telematics device;

transmitting said first set of data to a central server;

capturing a second set of data according to a second recording criteria, wherein the second set of data comprises operational data for the vehicle including telematics data indicative of vehicle dynamics and contextual data indicative of location and time data, wherein the second set of data is captured at a higher frequency than the first set of data;

storing said second set of data in the telematics device, wherein the stored set of data is periodically overwritten;

selectively retrieving the second set of data using an accident key in the event of an accident and transferring to the central server;

determining a time of the accident by the central server based at least in part on the second set of data; and combining at least portions of the first set of data and the second set of data to evaluate conditions relating to the vehicular accident.

2. The method for evaluating data relating to a vehicular accident of claim 1 wherein the step of selectively retrieving the second set of data comprises:

engaging the telematics device or vehicle with an accident key configured to extract the second set of data and store the data thereon.

3. The method for evaluating data relating to a vehicular accident of claim 2, wherein the engaging step occurs after the vehicular accident.

4. The method for evaluating data relating to a vehicular accident of claim 1, wherein the step of storing said first set of data in a telematics device comprises storing in a first memory and the step of storing said second set of data in the telematics device comprises storing in a second memory.

5. The method for evaluating data relating to a vehicular accident of claim 1, wherein the second set of memory is overwritten approximately every hour.

6. The method for evaluating data relating to a vehicular accident claim 1, wherein the second recording criteria comprises collecting data according to a predetermined frequency.

7. The method for evaluating data relating to a vehicular accident of claim 6, wherein the first recording criteria comprises collecting data based at least in part on a predefined vehicle event.

8. The method for evaluating data relating to a vehicular accident of claim 1 further comprises the steps of:

capturing a third set of data using a portable data acquisition device relating to a service being performed;

transmitting the data to the central server; and combining at least portions of the third set of data with the portions of the first set of data and the second set of data to evaluate conditions relating to the vehicular accident.

9. The method for evaluating data relating to a vehicular accident of claim 1 further comprising the steps of:

plotting the location data within a predetermined period of the determined time of the accident; and generating a graphical display.

10. A system for retrieving and storing data relating to an vehicle accident comprising:

a plurality of sensors configured to collect operational data including telematics data indicative of vehicle dynamics and contextual data indicative of location and time;

a telematics device having a first memory and a second memory wherein the first memory is configured to store a first set of data collected from the plurality of sensors according to a first criteria and the second memory is configured store to a second set of data collected from the plurality of sensors according to a second criteria, wherein further, the telematics device is configured to transfer the first set of data to a central server;

an accident key configured to communicate with the telematics device and extract the second set of data following a vehicle accident and further configured to communicate the second set of data to a central server; and the central server configured to:

determine a time of the accident based at least in part on the second set of data; and combine at least portions of the first set of data and the second set of data to evaluate conditions relating to the vehicle accident.

11. The system for retrieving and storing data relating to an vehicle accident according to claim 10, wherein the accident key physically connects to the telematics device.

12. The system for retrieving and storing data relating to an vehicle accident according to claim 10, wherein the telematics device is further configured to overwrite the second set of data approximately every hour.

13. The system for retrieving and storing data relating to an vehicle accident according to claim 10, wherein the second recording criteria comprises collecting data according to a predetermined frequency.

14. The system for retrieving and storing data relating to an vehicle accident according to claim 13, wherein the first recording criteria comprises collecting data based at least in part on a vehicle event.

15. The system for retrieving and storing data relating to an vehicle accident according to claim 10, further comprising:

a portable data acquisition device configured to collect a third set of data relating to a service being performed and to transmit the third set of data to the central server; and wherein the central server is further configured to combine at least portions of the third set of data with the portions of the first set of data and the second set of data to evaluate conditions relating to the vehicle accident.

16. The system for retrieving and storing data relating to an vehicle accident according to claim 10, wherein the central server is further configured to:

plot the location data within a predetermined period of the determined time of the accident; and generate a graphical display.

17. A method for evaluating a vehicle accident comprising the steps of:

receiving, via one or more processors, data relating to the operation of a vehicle involved in an accident from a telematics device including location data, operational data, and associated time data for a predetermined time period;

comparing, via one or more processors, a horizontal dilution of precision (HDOP) value associated with the location data to an accuracy threshold, wherein the accuracy threshold is less than or about five;

filtering data not satisfying the accuracy threshold; and determining the time of the accident based at least in part on the received data.

18. The method of claim 17 further comprising the steps of:

plotting the location data within a predetermined period of the determined time of the accident; and generating a graphical display.

19. The method of claim 17 further comprising the steps of associating the operational data with the location data based on the time data.

* * * * *